US012577361B2

(12) United States Patent
Zhang et al.

(10) Patent No.: US 12,577,361 B2
(45) Date of Patent: *\*Mar. 17, 2026**

(54) BIODEGRADABLE FOAMS

(71) Applicant: CRUZ FOAM, INC., Santa Cruz, CA (US)

(72) Inventors: Xiaolin Zhang, San Jose, CA (US); Marco Rolandi, Los Gatos, CA (US); John Felts, Santa Cruz, CA (US)

(73) Assignee: Cruz Foam, Inc., Santa Clara, CA (US)

( * ) Notice: Subject to any disclaimer, the term of this patent is extended or adjusted under 35 U.S.C. 154(b) by 909 days.

This patent is subject to a terminal disclaimer.

(21) Appl. No.: 17/049,170

(22) PCT Filed: May 6, 2019

(86) PCT No.: PCT/US2019/030832
§ 371 (c)(1),
(2) Date: Oct. 20, 2020

(87) PCT Pub. No.: WO2019/217268
PCT Pub. Date: Nov. 14, 2019

(65) Prior Publication Data
US 2021/0238393 A1 Aug. 5, 2021

Related U.S. Application Data

(60) Provisional application No. 62/795,659, filed on Jan. 23, 2019, provisional application No. 62/746,223, (Continued)

(51) Int. Cl.
C08J 9/00 (2006.01)
C08J 9/08 (2006.01)
(Continued)

(52) U.S. Cl.
CPC ........... *C08J 9/0061* (2013.01); *C08J 9/0023* (2013.01); *C08J 9/08* (2013.01); *C08J 9/365* (2013.01);
(Continued)

(58) Field of Classification Search
None
See application file for complete search history.

(56) References Cited

U.S. PATENT DOCUMENTS 5,011,864 A 4/1991 Nielsen et al.
5,256,702 A 10/1993 Grigat et al.
(Continued)

FOREIGN PATENT DOCUMENTS

CN 1112143 A 11/1995
CN 1351951 C 5/2002
(Continued)

OTHER PUBLICATIONS

Aimin, Biodegradable Starch Based Foaming Composition, Jul. 12, 2006, machine translation of CN1800249 (Year: 2006).*
(Continued)

*Primary Examiner* — Chinessa T. Golden
(74) *Attorney, Agent, or Firm* — Christensen O'Connor Johnson Kindness PLLC

(57) ABSTRACT

A composite material includes a polymer matrix with a polymer having D-glucosamine monomer units and 50% or fewer N-acetyl-D-glucosamine monomer units. A salt can be disposed in the polymer matrix. A dispersed phase is disposed in the polymer matrix with the salt, and the dispersed phase and the polymer matrix form a porous composite foam. The porous composite foam includes, by weight, 0.5-3 times the dispersed phase to the polymer matrix, and the porous composite foam has a density of less than 1 g/cm³.

21 Claims, 8 Drawing Sheets

Related U.S. Application Data filed on Oct. 16, 2018, provisional application No. 62/746,240, filed on Oct. 16, 2018, provisional application No. 62/667,996, filed on May 7, 2018.

(51) Int. Cl.
    *C08J 9/36*          (2006.01)
    *C08L 5/08*          (2006.01)

(52) U.S. Cl.
    CPC ............. *C08L 5/08* (2013.01); *C08J 2201/03* (2013.01); *C08J 2203/02* (2013.01); *C08J 2305/08* (2013.01); *C08J 2401/02* (2013.01); *C08J 2403/02* (2013.01); *C08J 2405/08* (2013.01); *C08J 2489/04* (2013.01); *C08J 2497/02* (2013.01); *C08J 2499/00* (2013.01)

(56) References Cited

U.S. PATENT DOCUMENTS

| | | | |
|---|---|---|---|
| 5,756,111 | A | 5/1998 | Yoshikawa et al. |
| 6,221,924 | B1 * | 4/2001 | Mori ........................ C08J 9/125 |
| | | | 521/50 |
| 7,041,369 | B1 | 5/2006 | Mackey et al. |
| 8,114,919 | B2 | 2/2012 | Weidinger |
| 12,162,259 | B2 * | 12/2024 | Zhang ........................ B32B 5/18 |
| 2001/0014388 | A1 | 8/2001 | Bastioli et al. |
| 2001/0014702 | A1 | 8/2001 | Harfmann et al. |
| 2003/0021921 | A1 | 1/2003 | Debraal et al. |
| 2003/0143388 | A1 | 7/2003 | Reeves et al. |
| 2003/0155679 | A1 | 8/2003 | Reeves et al. |
| 2004/0197545 | A1 | 10/2004 | Gehlsen et al. |
| 2005/0202229 | A1 | 9/2005 | Ozasa et al. |
| 2006/0293418 | A1 | 12/2006 | Matuana et al. |
| 2007/0292643 | A1 | 12/2007 | Renn |
| 2009/0214853 | A1 | 8/2009 | Quist et al. |
| 2009/0263601 | A1 | 10/2009 | Renn |
| 2009/0324913 | A1 * | 12/2009 | Bastioli .................... C08J 9/122 |
| | | | 442/221 |
| 2011/0001255 | A1 | 1/2011 | Tardif et al. |
| 2011/0059162 | A1 | 3/2011 | Reed et al. |
| 2011/0274726 | A1 | 11/2011 | Guo et al. |
| 2012/0024306 | A1 | 2/2012 | Mishra et al. |
| 2012/0077012 | A1 | 3/2012 | Liu et al. |
| 2012/0235090 | A1 | 9/2012 | Maeda et al. |
| 2013/0287836 | A1 * | 10/2013 | Ingber ...................... A61P 31/00 |
| | | | 424/443 |
| 2014/0061547 | A1 | 3/2014 | Kono et al. |
| 2014/0219962 | A1 * | 8/2014 | Zhang ...................... A61L 27/56 |
| | | | 435/375 |
| 2014/0256925 | A1 | 9/2014 | Catchmark et al. |
| 2014/0371354 | A1 * | 12/2014 | Evans ...................... C08L 5/08 |
| | | | 524/29 |
| 2015/0057368 | A1 | 2/2015 | Connelly et al. |
| 2015/0299383 | A1 | 10/2015 | Trumbo et al. |
| 2015/0374877 | A1 | 12/2015 | Guo et al. |
| 2016/0168311 | A1 | 6/2016 | Cuero Rengifo et al. |
| 2016/0207251 | A1 | 7/2016 | Cik |
| 2020/0239670 | A1 | 7/2020 | Rolandi et al. |

FOREIGN PATENT DOCUMENTS

| | | | |
|---|---|---|---|
| CN | 1410452 | A | 4/2003 |
| CN | 1587306 | A | 3/2005 |
| CN | 1628865 | A | 6/2005 |
| CN | 1800249 | A * | 7/2006 |
| CN | 101381500 | A | 3/2009 |
| CN | 101935440 | A | 1/2011 |
| CN | 101974189 | A | 2/2011 |
| CN | 101654537 | B | 3/2011 |
| CN | 101301491 | B | 6/2011 |
| CN | 103012836 | A | 4/2013 |
| CN | 103709452 | A | 4/2014 |
| CN | 104558677 | A | 4/2015 |

| | | | | | |
|---|---|---|---|---|---|
| EP | 427219 | A | * | 5/1991 | ........... A61L 15/225 |
| EP | 0747420 | A1 | | 12/1996 | |
| JP | 6390507 | A | | 4/1988 | |
| JP | 0565359 | A | | 3/1993 | |
| KR | 960004436 | B1 | | 6/1993 | |
| WO | 2012030805 | A2 | | 3/2012 | |
| WO | 2013131079 | A1 | | 9/2013 | |
| WO | WO-2018017837 | A1 | * | 1/2018 | ............. B63B 32/40 |
| WO | 2019217268 | A9 | | 1/2020 | |
| WO | 2020237205 | A1 | | 11/2020 | |
| WO | 2021086787 | A1 | | 5/2021 | |

OTHER PUBLICATIONS

Aimin, Biodegradable Starch Base Foaming Composition, Jul. 12, 2006, machine translation of CN 1800249 (Year: 2006).*

Chinese Office Action, with English Translation, issued Nov. 14, 2022, in corresponding Chinese Patent Application No. 201980030829. 7, 10 pages.

Emilia Szymańska, et al., Stability of Chitosan—A Challenge for Pharmaceutical and Biomedical Applications, Marine Drugs, Published Apr. 1, 2015, vol. 13, pp. 1819-1846.

International Search Report and Written Opinion mailed Aug. 25, 2020, issued in International Application No. PCT/US2020/034361, filed May 22, 2020, 10 pages.

Second Chinese Office Action mailed Jun. 22, 2022, issued in corresponding Chinese Application No. 201980030829.7, filed Nov. 6, 2020, 12 pages.

Chinese Rejection Decision, with English Translation, issued Jun. 27, 2023, in corresponding Chinese Patent Application No. 201980030829.7, 14 pages.

US Office Action issued May 2, 2023, in corresponding U.S. Appl. No. 17/612,306, 8 pages.

US Office Action issued Jul. 3, 2023, in corresponding U.S. Appl. No. 17/612,306, 16 pages.

EP Search Report—EP 19800604.1 dated Feb. 10, 2022, 7 pages.

First Office Action dated Dec. 25, 2021 in corresponding Chinese application No. 201980030829.7, 21 pages.

Chinese Office Action, with English Translation, issued Mar. 17, 2023, in corresponding Chinese Patent Application No. 201980030829. 7, 13vpages.

ASTM Int'l Standard Designation: D1621-10, "Standard Test Method for Compressive Properties of Rigid Cellular Plastics," Apr. 2010, 5 pages.

ASTM Int'l Standard Designation: D1622/D1622M-14, "Standard Test Method for Apparent Density of Rigid Cellular Plastics," Apr. 2014, 4 pages.

ASTM Int'l Standard Designation: D1623-09, "Standard Test Method for Tensile and Tensile Adhesion Properties of Rigid Cellular Plastics," Sep. 2009, 7 pages.

ASTM Int'l Standard Designation: D3575-20, "Standard Test Methods for Flexible Cellular Materials Made from Olegin Polymers," Feb. 2020, 11 pages.

ASTM Int'l Standard Designation: D3576-15, "Standard Test Method for Cell Size of Rigid Cellular Plastics," Oct. 2015, 5 pages.

ASTM Int'l Standard Designation: D6226-15, "Standard Test Method for Open Cell Content of Rigid Cellular Plastics," Sep. 2015, 7 pages.

Banerjee et al., "Alginate-chitosan composite hydrogel film with macrovoids in the inner layer for biomedical applications," J. Appl. Polym. Sci., Jun. 10, 2019, 9 pages.

Calles-Arriaga, et al., "Thermal characterization of microwave assisted foaming of expandable polystyrene," Ingeniería, Investigación y tecnología. Jan. 2016, 7 pages.

Castel-Molieres et al., "Influence of Homogenization Technique and Blend Ratio on Chitosan/Alginate Polyelectrolyte Complex Properties," Journal of Medicine and Biological Engineering, v. 38(1); Feb. 2018, pp. 10-21.

Flagel, "Mycelium: Using Mushrooms to Make Packaging Materials," https://matmatch.com/blog, Apr. 3, 2020, 21 pages.

Makarios-Laham, et al., Biodegradability of chitin- and chitosan-containing films in soil environment, J Environ Polym Degr 3,(1), Jan. 1995, 6 pages.

(56)　　　　　References Cited

OTHER PUBLICATIONS

Mohandas et al., "Exploration of alginate hydrogel/nano zinc oxide composite bandages for infected wounds" International Journal of Nanomedicine Oct. 1, 2015, pp. 53-66.

PCT/US19/30832—International Search Report and Written Opinion dated Aug. 23, 2019, 13 pages.

PCT/US2020/034361—International Search Report and Written Opinion dated Aug. 25, 2020, 17 pages.

PCT/US2020/057373—International Search Report and Written Opinion dated Mar. 3, 2021, 13 pages.

Ping Li et al., "Chitosan-Alginate Nanoparticles as a Novel Drug Delivery System for Nifedipine," International Journal of Biomedical Science, vol. 4, No. 3, Sep. 2008, pp. 221-228.

Rudyardjo, et al., "The synthesis and characterization of hydrogel chitosan-alginate with the addition of plasticizer auric acid for wound dressing application," In Journal of Physics: Conference Series May 1, 2017 (vol. 853, No. 1, p. 012042). IOP Publishing 8 pages.

Shigemasa, et al. "Evaluation of different absorbance ratios from infrared spectroscopy for analyzing the degree of deacetylation in chitin," International Journal of Biological Macromolecules, 18(3), Apr. 1, 1996, 237-42.

Zhao et al., "Preparation of Fibrous Chitosan/Sodium Alginate Composite Foams for the Absorption of Cationic and Anionic Dyes," Journal of Hazardous Materials vol. 403, Sep. 22, 2020, pp. 1-10.

PCT/US2020/057373—Invitation to Pay Additional Fees and, Where Applicable, Protest Fee dated Dec. 29, 2020, 2 pages.

US Office Action issued Nov. 1, 2023, in corresponding U.S. Appl. No. 17/612,306, 29 pages.

Non-Final Office Action issued Jul. 2, 2024, in corresponding U.S. Appl. No. 17/773,514, filed Apr. 29, 2022, 38 pages.

Final Office Action issued Nov. 26, 2024, in corresponding U.S. Appl. No. 17/773,514, filed Apr. 29, 2022, 13 pages.

US Office Action issued Jul. 8, 2025, in corresponding U.S. Appl. No. 17/773,514, 31 pages.

* cited by examiner

101

101

211

800

| Source/Material | | | Density | Compressive Strength (10% deformation) | Elastic Modulus |
|---|---|---|---|---|---|
| | | | g/cm³ | Mpa | Mpa |
| Organic Foam | No Plasticizer | | 0.150 | 0.200 | 4.230 |
| | | | 0.230 | 0.480 | 6.550 |
| | With Plasticizer | 0.25 vol% | 0.200 | 0.170 | 3.400 |
| | | 1 vol% | 0.270 | 0.106 | 2.010 |

FIG. 8

BIODEGRADABLE FOAMS

CROSS-REFERENCE TO RELATED APPLICATIONS

This application claims the benefit of U.S. Provisional Application No. 62/667,996, filed May 7, 2018; U.S. Provisional Application No. 62/746,223, filed Oct. 16, 2018; U.S. Provisional Application No. 62/746,240, filed Oct. 16, 2018; and U.S. Provisional Application No. 62/795,659, filed Jan. 23, 2019, all of which are hereby incorporated by reference.

TECHNICAL FIELD

This disclosure relates generally to foams.

BACKGROUND INFORMATION

Petroleum-based plastic foam is ubiquitous in modern society: it is used for packaging, flotation, and the like. However, petroleum-based plastic foam suffers from many drawbacks. For example, the ocean has become filled with petroleum-based foam waste. This is because many petroleum-based foams, such as polystyrene foam take 500 years or more to decompose. Moreover, petroleum-based plastic foams are either entirely non-recyclable (because of their chemical composition) or not economically viable for recycling due to the low material content of the foam—petroleum-based foams are mostly air.

Petroleum-based foams tend to be toxic or made by toxic processes. Although petroleum-based foams resist decomposition, when the foams do decompose they can result in the release of toxic compounds into the environment (e.g., degraded monomer units of the foam). Furthermore, polystyrene (and other petroleum-based foams) is made using toxic chemicals such as benzene and styrene, which have been shown to be carcinogenic and slowly leach into the environment and food products in contact with the foam.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 8 shows a table of measured foam properties, in accordance with an embodiment of the disclosure.

DETAILED DESCRIPTION

Embodiments of biodegradable foams, biodegradable foam devices, and systems, apparatuses, and methods for producing the biodegradable foams are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As stated above, petroleum-based foams suffer from many drawbacks. Described herein are biodegradable foams, biodegradable foam devices, and systems, apparatuses, and methods for producing the biodegradable foams that solve the problems associated with conventional petroleum-based foams. The foams described here are biodegradable, nontoxic, and produced with nontoxic precursors and through environmentally friendly processes. As will be shown, these biodegradable foams represent a significant advancement over existing industrial foam technologies since the biodegradable foams have similar or better mechanical, chemical, and thermal properties than the petroleum-based foams, with none of the negative environmental impact.

Figure 1:
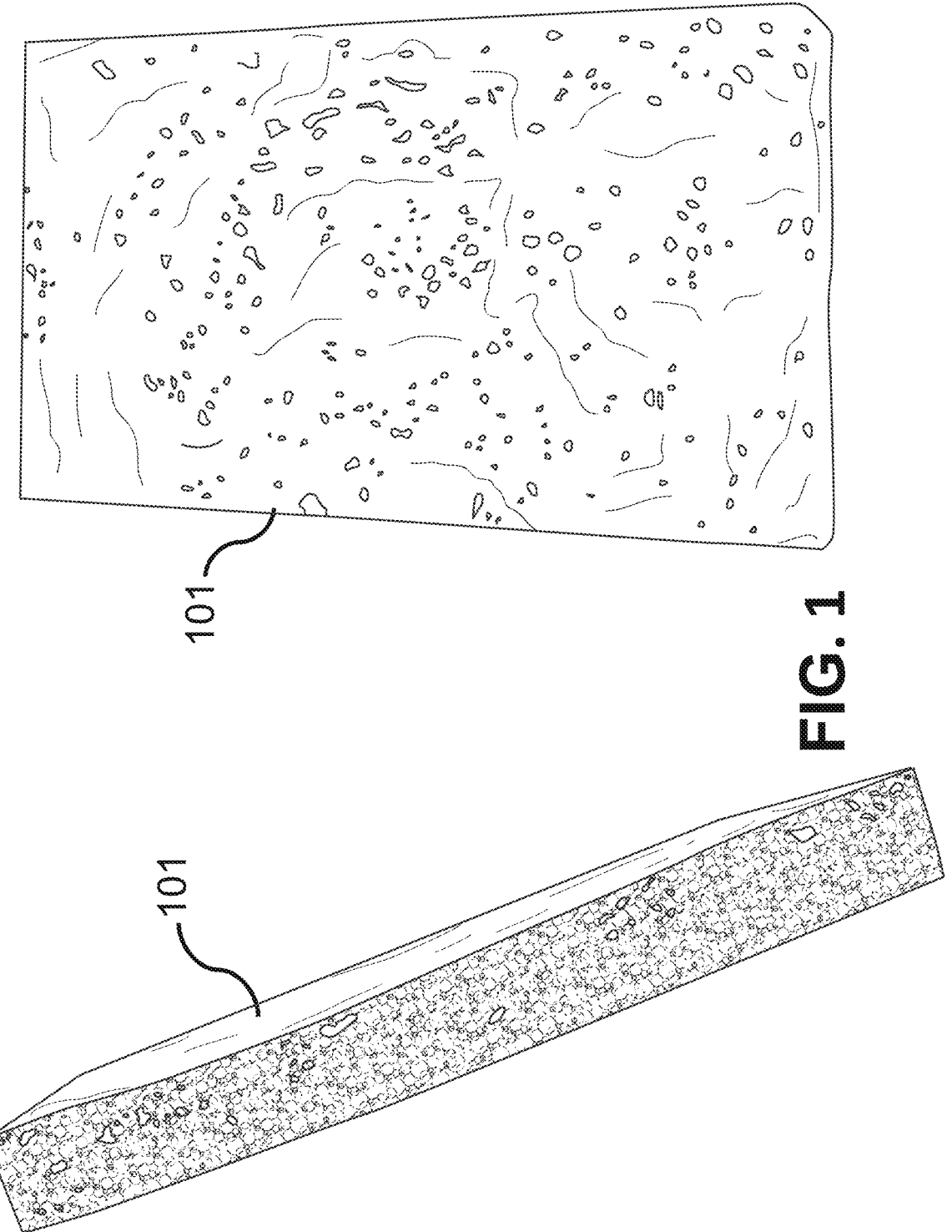
FIG. 1 illustrates a composite foam sample, in accordance with an embodiment of the disclosure.

FIG. 1 illustrates a composite foam sample 101, in accordance with an embodiment of the disclosure. The left figure is a cross sectional view of the organic composite foam sample 101, and the right figure shows a top-down view of the same foam sample 101. The composite (e.g., a material made from two or more constituent materials) foam material 101 includes a matrix including a polymer (e.g., chitosan) including monomer units of D-glucosamine and N-acetyl-D-glucosamine. In the depicted embodiment, the polymer may include 70% or less N-acetyl-D-glucosamine; however in other embodiments, the polymer may include 60% or less N-acetyl-D-glucosamine, 50% or less N-acetyl-D-glucosamine: 40% or less N-acetyl-D-glucosamine, 30% or less N-acetyl-D-glucosamine, 20% or less N-acetyl-D-glucosamine, or 10% or less N-acetyl-D-glucosamine. A dispersed phase may be disposed in the polymer matrix, and the dispersed phase and the polymer matrix form porous composite foam 101. In the depicted embodiment, porous composite foam 101 includes, a ratio of 0.5-3 of the dispersed phase weight to the polymer matrix weight, and has a density of less than 1 $g/cm^3$. For some composite foam embodiments, a ratio of about 0.5 to 2.5 of the dispersed phase weight to the polymer matrix weight is utilized. In general the ratio should be at a level effective to maintain structural integrity of the composite foam. While in some embodiments, the polymer matrix includes chitosan, both chitin, and chitosan oligosaccharide may also be used as a polymer in the polymer matrix in accordance with the teachings of the present disclosure.

In some embodiments, the dispersed phase includes at least one of chitin, starch, or cellulose. More specifically, examples of dispersed phases may include at least one of (unprocessed or minimally processed) shellfish shells, wood flour, hemp, paper pulp (e.g., including broken down recycled paper), coconut husks, cornstarch, or tapioca powder, or the like. It is appreciated that foam 101 depicted, has been made with all of the aforementioned dispersed phases, and that the dispersed phases are not mutually exclusive (the dispersed phases can be used individually and in combination). For example, all of the dispersed phases mentioned above may be combined in the same piece of composite foam 101, or only some of the dispersed phases may be included in the same piece of composite foam 101.

The discovery of adding a chitosan-compatible dispersed phase to the foam is a significant advancement in biodegradable foam technology because the properties of the foam can be tuned for a variety of applications. One can tune the pore size for example, by using a closed-mold during heating and changing the pressure inside the mold. By increasing the internal pressure, foams with smaller pore sizes can result. One can tune the density of the foam for example, by 1) changing the amount dispersed phase material and the amount of blowing agent (less dispersed phase material, more blowing agent, lower foam density), or 2) optimizing the internal pressure and temperature of the closed-mold (lower pressure, higher temperature, lower foam density). Indeed, the dispersed phases may enhance the mechanical properties of the foam by carrying part of applied loads (e.g., in tension, strain may be imparted to the dispersed phase—e.g., fibers—in the foam and not entirely carried by the polymer matrix). Furthermore, using biodegradable waste products, which may be locally sourced, reduces the cost of foam production. Dispersed phases may not totally dissolve in an acid solution, which may be used to make the foam, and may be distinct from the polymer matrix in the resultant foam (e.g., adhered to the polymer matrix but separate—not dissolved—in the polymer matrix).

In some embodiments, a nontoxic (e.g., safe for human consumption, safe for human skin contact, not generally regarded as carcinogenic, or the like) plasticizer may be disposed in the matrix material to impart a flexible character to the porous composite foam. Thus, organic composite foam sample 101 may be deformed (e.g., compressed, bent, stretched, or the like) and return to its original form without breaking. In some embodiments, the nontoxic plasticizer may include low molecular weight polymers, polyols, alcohols, or the like. In one embodiment, a polyol that is used as a plasticizer may be glycerol, and glycerol may be added from 0.0001 vol % to 50 vol % depending on the target foam flexibility. In one embodiment, a dye may be added to the polymer matrix, and the dye (e.g., food colorings or other nontoxic dyes) imparts a color (e.g., red, green, blue, yellow, orange, etc.) to the porous composite foam. It is appreciated that this color is not amenable to illustration due to the black and white nature of the drawings.

To produce the specific embodiment of foam sample 101 shown in FIG. 1, a solution of 0.5 M acetic acid ($CH_3COOH$) was prepared with deionized water. Chitosan was dissolved in this solution at 4% w/v. The solution was stirred until the chitosan was fully (or partially) dissolved and clear. Corresponding amounts of starch (e.g., a dispersed phase: 0.1-0.2 wt ratio relative to chitosan dissolved in solution), chitin powder (e.g., a dispersed phase: 0.5-2.5 wt ratio relative to chitosan dissolved in solution), and sodium bicarbonate ($NaHCO_3$) (0.5-1.5 wt ratio relative to the chitosan dissolved in solution) were added to the solution. The mixture underwent vigorous stirring. The mixture was then poured into a mold (which may be fully closed or open) and heated (in the mold) at 200-400° F. for 1-1.5 hr depending on the thickness of the final sample. In some embodiments, the mold may have heaters built into it. When heating was completed, the foam was transferred to a dehydrating oven to remove remaining moisture. The mixture then was placed into a vacuum chamber for 12 hrs. After vacuum, the foam was transferred to a drying container and underwent a 24-hr air-dry. In this particular embodiment, the recited range of dispersed phases may be critical to form a foam precursor that is not too viscous to work with, and not so watery as to collapse when drying.

With this method, the resulting foam is fully dried. In this specific embodiment, the foam has a density that can be tuned between 0.1-0.8 g/cm³ with varied pore size and porosity. This foam includes chitin and a residual amount of sodium acetate ($NaC_2H_3O_2$) and starch, all of which are nontoxic, biodegradable, and compostable. In other embodiments, other salts (e.g., not sodium acetate) may be left in the foam. As shown on the left, the cross-section of the foam reveals a uniform cellular structure. In the depicted embodiment, the average pore size can be tuned from 200 um-800 um. In some embodiments, the matrix polymer may be substantially chitosan (e.g., chitosan with some impurities), >90% chitosan, >80% chitosan, >70% chitosan, >60% chitosan, >50% chitosan, or the like depending on the desired mechanical properties and purity of chitosan used as a source for the foam.

Figure 2:
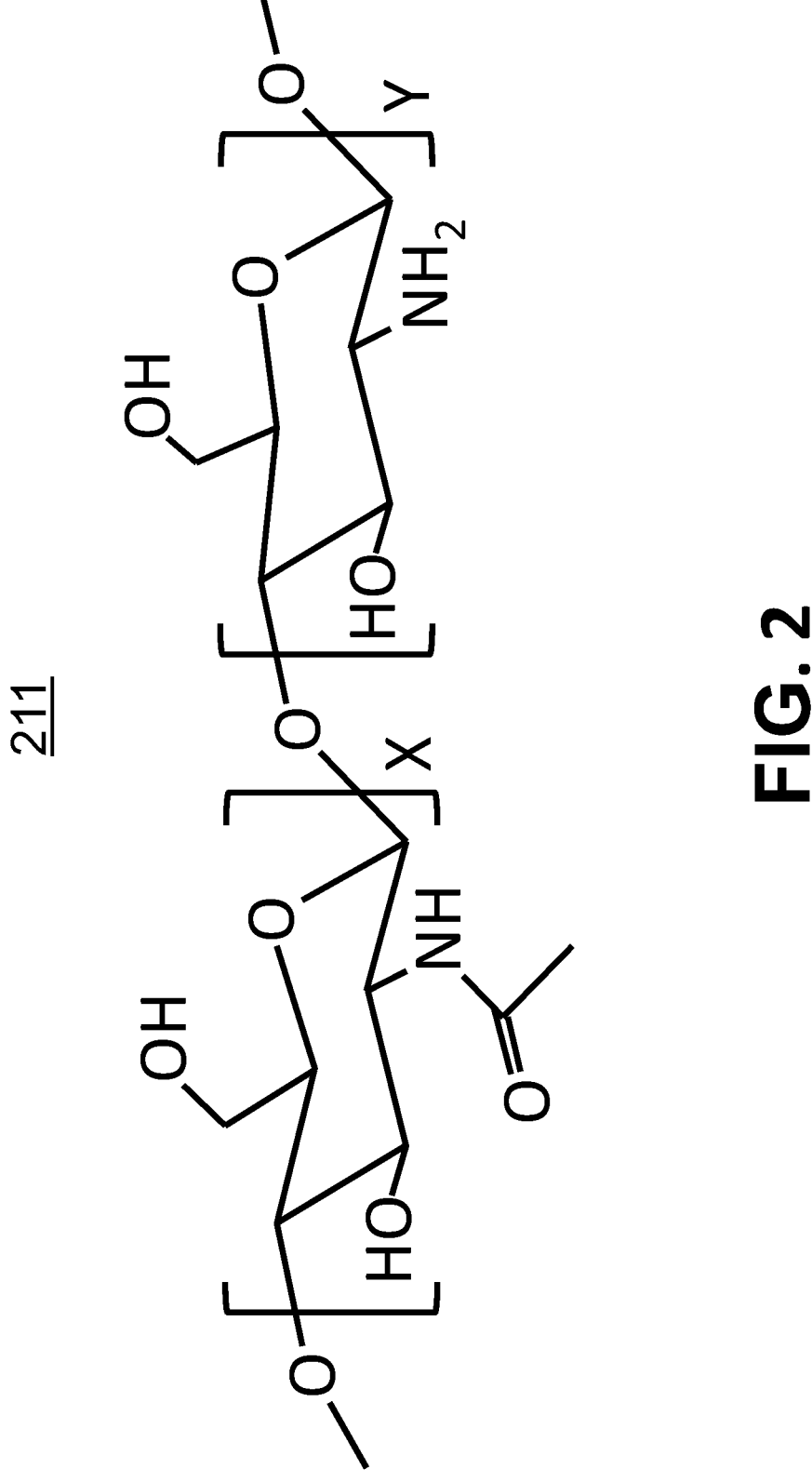
FIG. 2 illustrates the chemical structure of chitin and chitosan, in accordance with an embodiment of the disclosure.

FIG. 2 illustrates the chemical structure 211 of a polymer which can be characterized as chitin or as chitosan depending on the relative amounts of blocks X (with acetyl group) and block Y (with amine group) in the chain (which may be used in the foam of FIG. 1), in accordance with an embodiment of the disclosure. Deacetylation replaces the N-acetyl-glucosamine group in chitin (X block) with an N-glucosamine (Y block) resulting in a more hydrophilic and positively charged polymer, which can be described as partially deacetylated chitin. Alternatively, acetylation of chitosan can yield a partially acetylated chitosan. When the ratio between acetyl and amine groups is higher than 1:1 (x>y: greater than a 50%/50% split of the two monomer units), the partially deacetylated chitin polymer may be referred to as chitin, when the ratio is lower, the partially acetylated chitosan polymer may be referred to as chitosan. Put another way, chitosan has 50% or more N-glucosamine groups, whereas chitin has more than 50% N-acetyl-glucosamine groups. The relative concentrations of the acetyl and amine groups in a polymer can be measure for example using techniques described in Shigemasa, et al., "Evaluation of different absorbance ratios from infrared spectroscopy for analyzing the degree of deacetylation in chitin," International Journal of Biological Macromolecules 18 (1996) 237-242, which is incorporated by reference as if fully set forth herein.

Both of these polymers may be derived from marine invertebrate shells (e.g., shrimp, lobster, and crab shells), are biodegradable, nontoxic, and structurally robust. While chitosan may form the polymer matrix of the foam (e.g., the foam depicted in FIG. 1), chitin may be used for the dispersed phase, as well as other materials, such as naturally occurring waste materials (e.g., paper pulp). One of ordinary skill in the art having the benefit of the present disclosure will appreciate that the chemical requirements for the chitosan matrix material may be more stringent than the material requirements for dispersed phase—which may be any biodegradable product (e.g., shellfish shells, wood flour, paper pulp, cornstarch, coconut husks, wood/paper pulp, tapioca powder, etc.) that is capable of being integrated into the chitosan matrix to form the composite.

Through experimentation it has been shown that processing of chitosan and chitin is very different, and the use of chitosan in the foam process results in different structures with different material properties than foams with a chitin matrix. For example, the solubility of chitin and chitosan in solvents is dissimilar, and accordingly, procedures for foaming, adding a dispersed phase, and heating/hardening are very different. Thus, the final chitosan foam is distinct from foams made from chitin, and the processes used to make the chitosan-based foam may not be applicable to making chitin foams. Similarly, processes to make chitin foams may not be applicable to making the foam disclosed herein.

Figure 3:
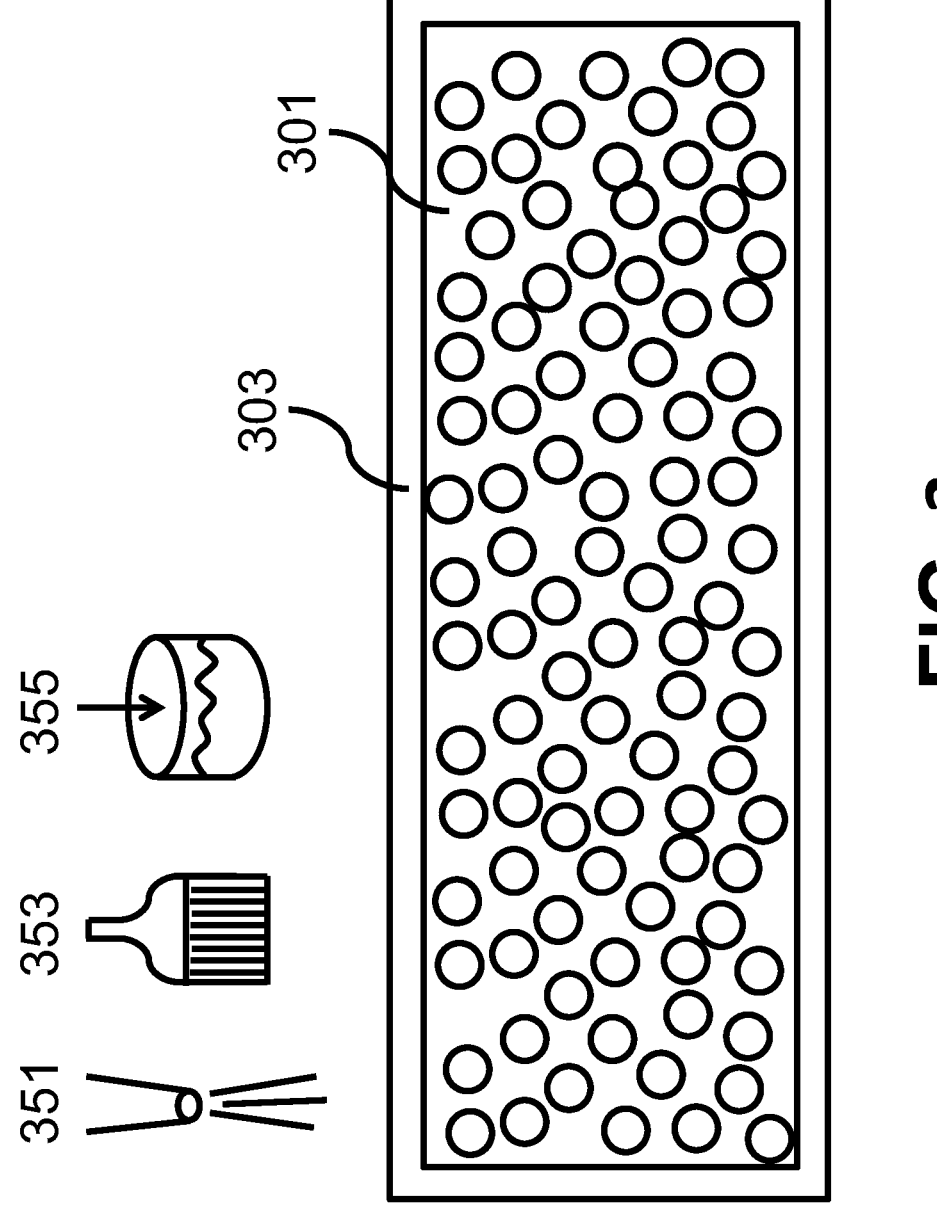
FIG. 3 illustrates a coating on the organic composite foam of FIG. 1, in accordance with an embodiment of the disclosure.

FIG. 3 illustrates a coating 303 on the organic composite foam 301 (e.g., the foam of FIG. 1), in accordance with an embodiment of the disclosure. In the depicted cross section, coating 303 is disposed on the exterior of the porous (illustrated circles represent pores) composite foam, and the coating is substantially non-porous (e.g., it doesn't contain macro-sized holes for water to travel through: however, the coating still may be micro-porous or nano-porous).

In some embodiments, coating 303 may be applied to foam 301, by spray coating (see e.g., nozzle 351), brushing (see e.g., brush 353), dip coating (see e.g., bath 355), etc. In one embodiment, a substantially deacetylated chitin or chitosan solution (e.g., 1-4 wt % in 4% w/v acetic acid solution) is applied to all surfaces. After applying, the sample is dried in a dehydrator or oven. One of ordinary skill in the art having the benefit of the present disclosure will appreciate that the chitosan coating improves the durability of the foam in humid conditions, and also gives the foam a smooth surface finish. More specifically, coating 303 encapsulates porous composite foam 301 to prevent water ingression into porous composite foam 301. It is appreciated that in the depicted embodiment, coating 303 includes the same chemical composition (i.e. chitosan) as the polymer in the polymer matrix of foam 301. However, in other embodiments other polymer coatings 303 (e.g., polylactic acid, polyglycolide, or the like) may be applied to foam 301.

Figure 4:
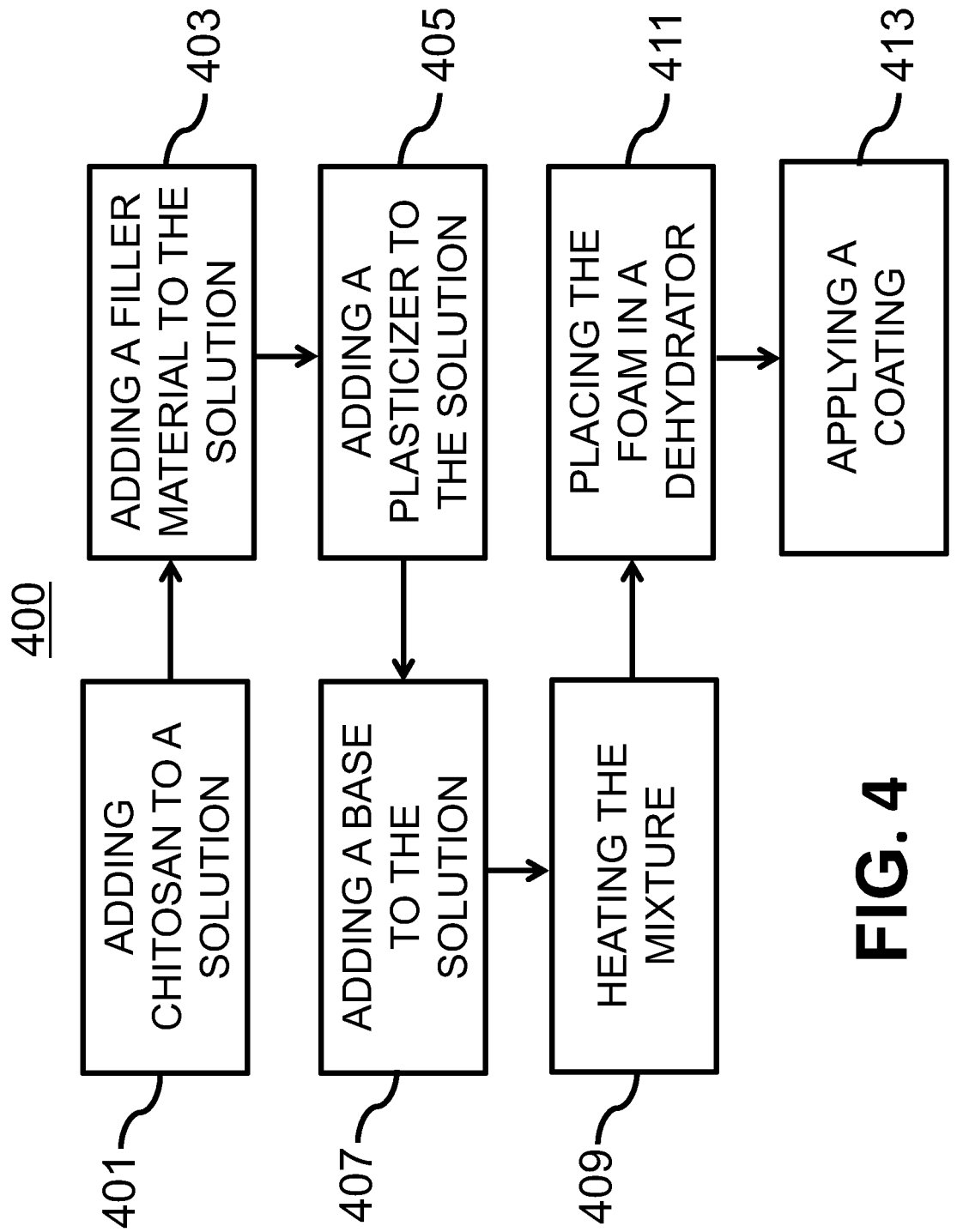
FIG. 4 illustrates a method of making foam, in accordance with an embodiment of the disclosure.

FIG. 4 illustrates a method 400 of making foam, in accordance with an embodiment of the disclosure. One of ordinary skill in the art having the benefit of the present disclosure will appreciate that the blocks depicted (e.g., blocks 401-413) may occur in any order and even in parallel. Moreover, blocks may be added to, or removed from, method 400 in accordance with the teachings of the present disclosure.

Block 401 illustrates adding chitosan to a solution, and the solution includes acid. In some embodiments, the solution including the acid has a pH of 3-6 (prior to adding the base). In some embodiments, it may be preferable to keep the pH at around 4.6 (a general range of pH 4-5)—this is advantageous over processes involving extreme pH ranges (which may use bases like sodium hydroxide or potassium hydroxide) since the processes here are much safer (no risk of burns and dangerous spills). The pH ranges recited here may be important in order to fully dissolve the chitosan. In one embodiment, the chitosan is dissolved in 0.5 M acetic acid ($CH_3COOH$) solution at a concentration of 4% wt/v. However, in some embodiments, the acid may include at least one of acetic acid, formic acid, lactic acid, hydrochloric acid, nitric acid, sulfuric acid, or the like. In one embodiment, the solution may include water, a cosolvent (e.g., ethanol, methanol, etc.) with a lower boiling point than the water, and the acid. The low boiling point cosolvent may help reduce the time to dry the foam, since the solvent carrying the foam materials evaporates faster and at lower temperatures.

Block 403 depicts adding a dispersed phase (e.g., a phase that is composed of particles that are distributed in another phase—e.g., the polymer matrix) to the solution. In some embodiments, the dispersed phase includes at least one of chitin, cellulose, or starch. More specifically, the dispersed phase may include at least one of shellfish shells (e.g., minimally processed chitin), wood flour, paper pulp, hemp, coconut husks, corn starch, and/or tapioca powder. In some embodiments, a chitin dispersed phase is added to the mixture (e.g., 0.5-2.5 wt ratio against chitosan dissolved in solution). In some embodiments the foam may not include the dispersed phase.

Block 405 shows adding a nontoxic plasticizer to the solution, where the nontoxic plasticizer imparts a flexible character to the foam. In some embodiments, the nontoxic plasticizer includes a polyol or low molecular weight polymer (e.g., polyethylene glycol, or the like). Glycerol is a polyol with three hydroxyl groups. It is a nontoxic compound that enhances water absorption. In some embodiments, glycerol may be used as a plasticizer that is added to the chitosan-based foam formula to improve chitosan foam flexibility. The use of the plasticizer makes the foam more resistant to degradation from forces that stretch or compress the foam. When the initial deacetylated chitin (chitosan) solution in acetic acid is measured (e.g., 4% wt/v chitin in acetic acid solution), a volume percentage of glycerol (e.g., from 0.0001 vol % to 50 vol % of glycerol) can be added depending on the target foam flexibility. In some embodiments, depending on the specific formula for the amount of chitosan/glycerol in the mixture, the resulting foam may have a density ranging from 0.03 g/cc to 0.3 g/cc. The foam may be less rigid than chitosan foams made without glycerol, and has a flexibility property similar to flexible polyurethane and expanded polypropylene, without any of the negative environmental drawbacks. However, as stated above, other plasticizers, preferably nontoxic, (e.g., other than glycerol) may be used in accordance with the teachings of the present disclosure. It is appreciated that many conventional plasticizers may be endocrine disrupters and may leach from their host plastics. The plasticizers here can be nontoxic so this is not a problem.

The foam can be used in applications such as surfboards, and packaging (e.g., coolers). The plasticized foam is compressible, and can in some embodiments be elastic returning substantially to its original shape after compression. In some embodiments, after compression to a thickness on the order of 50% of an original thickness, the foam can return to greater than 90% of its original thickness. Additionally, a coating layer (see e.g., FIG. 3) may be applied to the foam, by brushing/spraying/etc., a deacetylated chitin (chitosan) solution (1-4 wt % in 4% wt/v acetic acid solution, or 0.5 M acetic acid) on all surfaces, and drying in a dehydrator. The chitosan coating improves the durability of the foam in humid condition, and also gives the foam a smooth surface finish.

Block 407 illustrates adding a base to the solution (after the chitosan and the dispersed phase is added to the solution) to foam the mixture (which includes the chitosan and the dispersed phase). The base will react with the acid in the solution to produce gasses and foam the mixture. In some embodiments, the base includes at least one of sodium bicarbonate, sodium carbonate, or calcium carbonate. Thus, a salt may result in the foam from the reacted acid and base. In some embodiments, the salt may include a sodium or a calcium salt (e.g., sodium acetate, calcium acetate, or the like). However, one of skill in the art having the benefit of the present disclosure will appreciate that the salt may be any resultant salt from the acid/base combination used to prepare the foam (e.g., any salts that result from mixing the example bases and example acids disclosed herein). In one embodiment, sodium bicarbonate (1:1 mol ratio against acetic acid in the solvent system) may be used as the blowing agent and to neutralize the acid in the mixture-no need to wash the foam since the blowing agent neutralizes the acid, thus reducing processing steps and cost. However, one of skill in the art having the benefit of the present disclosure will appreciate that other bases or foaming agents (e.g., any chemical system to produce gasses in the mixture) may be used in accordance with the teachings of the present disclosure.

Block 409 depicts heating the mixture, after adding the base, until the mixture has hardened into the foam. Heating may occur after vigorous mixing of the aforementioned ingredients. In some embodiments, the heating process may include heating the mixture in a closed or open mold. In one embodiment, the foam is heated at a constant temperature— depending on the size of the mold and the end application of the foam, the temperature may range from 180 F to 400 F. The mold is heated until the foam is set and hardened (e.g., depending on the size of the mold and heating temperature, this heating time may range from 10 min to 3 hours).

Block 411 shows placing the foam in a dehydrator to remove water from the foam. The dehydrator may be heated and may even pull vacuum on the foam. The foam may be placed in the dehydrator overnight to allow water to fully evaporate.

Block 413 depicts applying a coating to the foam. The coating layer may be applied to the foam, by brushing/ spraying/dipping/etc. with a deacetylated chitin (chitosan) solution (1-4% wt/v in 0.5 M acetic acid solution) on all surfaces, and drying in dehydrator.

Figure 5:
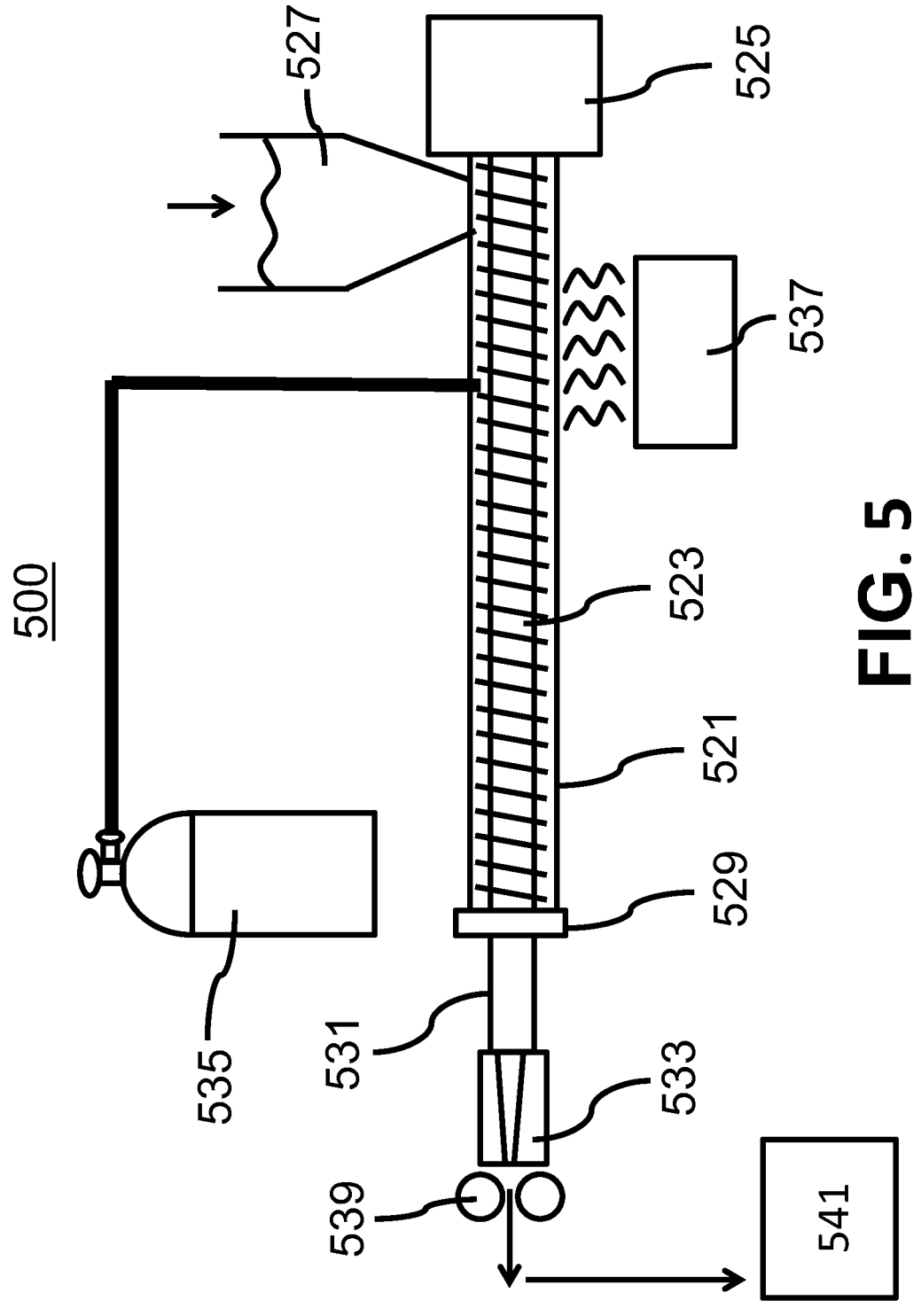
FIG. 5 illustrates a foam extrusion system and method, in accordance with an embodiment of the disclosure.

FIG. 5 illustrates a foam extrusion system 500 and method, in accordance with an embodiment of the disclosure. Foam extrusion system 500 includes barrel 521, screw 523, drive motor 525, input 527 (e.g., input for the mixture; depicted here as a "hopper"), breaker plate 529, feed pipe 531, die 533, foaming agent(s) in cylinder 535, heating unit 537, puller 539, and dehydrator 541. As illustrated a mixture is provided (in input 527) and the mixture includes a polymer, acid, filler material, and water. The polymer may include monomer units of D-glucosamine and N-acetyl-D-glucosamine, with 70% or less N-acetyl-D-glucosamine monomer units. In some embodiments, the mixture further includes a plasticizer (preferably nontoxic e.g., a polyol like glycerol) to impart a flexible character and in some embodiments an elastic character, to the porous composite foam. Similarly, in one or more embodiments, the dispersed phase includes at least one of chitin, cellulose, or starch (e.g., at least one of shellfish shells, wood flour, paper pulp, corn starch, coconut husks, tapioca powder, or the like). As will be discussed in greater detail later, in some embodiments, the mixture further includes an alcohol (e.g., ethanol, methanol, butanol, or the like). As shown, the mixture is inserted into the input 527 of the extrusion system 500, where it is fed into barrel 521. Extrusion system 500 pushes the mixture through one or more barrels 521—only one barrel 521 is depicted here, but one of skill in the art having the benefit of the present disclosure will appreciate that additional barrels may be coupled in series in accordance with the teachings of the present disclosure—with one or more screws 523 disposed in one or more barrels 521. As shown, the one or more screws 523 are coupled to one or more motors 525 to turn one or more screws 523, which push the mixture forward.

In the depicted embodiment, a foaming agent (e.g., contained in cylinder 535) is input (via a foaming agent input pipe) into extrusion system 500 to be received by the mixture, and foam the dispersed phase and the polymer matrix into the porous composite foam. In some embodiments, the foaming agent includes at least one of sodium bicarbonate, sodium carbonate, calcium carbonate, or carbon dioxide. In the depicted embodiment, heating unit 537 applies heat (depicted as wavy lines above heating unit 537) proximate to the input of extrusion system 500. Thus, the temperature and pressure of the mixture proximate to input 527 extrusion system 500 is higher than the temperature and the pressure proximate to the output (located by puller 539) of extrusion system 500.

Once the foam reaches the end of extrusion system 500 a shape of the porous composite foam is output from die 533. The shape has a fixed cross sectional profile (e.g., circular, square, rectangular, hexagonal, or the like). Puller 539 is positioned to receive the foam from die 533 and keep a constant tension on the foam being removed from the system. Tension may be achieved by having the rollers of puller 539 being engaged by a motor to turn the rollers and pull the foam from die 533. Dehydrator 541 may receive the foam, and dehydrator 541 may heat the foam or pull vacuum (e.g., reduce the pressure) on the foam to remove excess solvent.

As stated above, in some embodiments, ethanol may be introduced as a co-solvent, and can facilitate vapor evaporation of solvent for an extrusion-based foam manufacturing process. Ethanol is added into water at a volume fraction of 1%-90% (VEtOH:VH2O=1:99~1:9). Then, acetic acid may be added to the mixture, to keep the pH at around 4.6 (a general range of pH 4-5), which allows deacetylated chitin (chitosan) (1-10% w/v) to dissolve in this solvent system. Then the chitin (or other) dispersed phase is added to the mixture (e.g., 0.5-2.5 wt ratio against chitosan dissolved in solution) along with sodium bicarbonate (1:1 mol ratio against acetic acid in the solvent system) as the blowing agent to neutralize the acid in the mixture. Due to the evaporative nature (e.g., lower boiling point than water) of ethanol, this foam mixture has higher viscosity, and can go through a heated extruding pipeline with controlled flow rates for an extrusion process. After the foam is extruded out of the extruder, it hardens quickly, and forms a foam block. This block may then left overnight for a curing process which allows the excess solvent to evaporate. Ethanol is a feasible choice here as a co-solvent with water, since it is miscible with water and acetic acid. This formula facilitates vapor evaporation during foam manufacturing, and will increase the production turnaround. Also, due to the decreased volume of water in the initial mixture, the cellular structure of the foam can be improved due to the reduced amount of water vapor evaporation, which leads to enhanced process controllability.

To summarize one embodiment, a highly viscous dough-like mixture (e.g., including chitosan) may be made. Chitin or a combination of chitin/chitosan and paper pulp, corn starch, tapioca powder, coconut husks, wood flour, or any other dispersed phase may be added. The highly viscous dough like mixture is moved into extrusion system 500 at high temperature, and sodium bicarbonate (and/or other forming agents; e.g., $CO_2$ may be added as needed via a nozzle) is input into extrusion system 500. The mixture is extruded at a high temperatures and/or high pressure from an appropriately shaped nozzle into atmospheric pressure (lower pressure). As a result, the extruded material will expand. The foam may then be cured (e.g., in dehydrator 541) at high/medium temperature as needed to remove excess water and other solvents.

Figure 6:
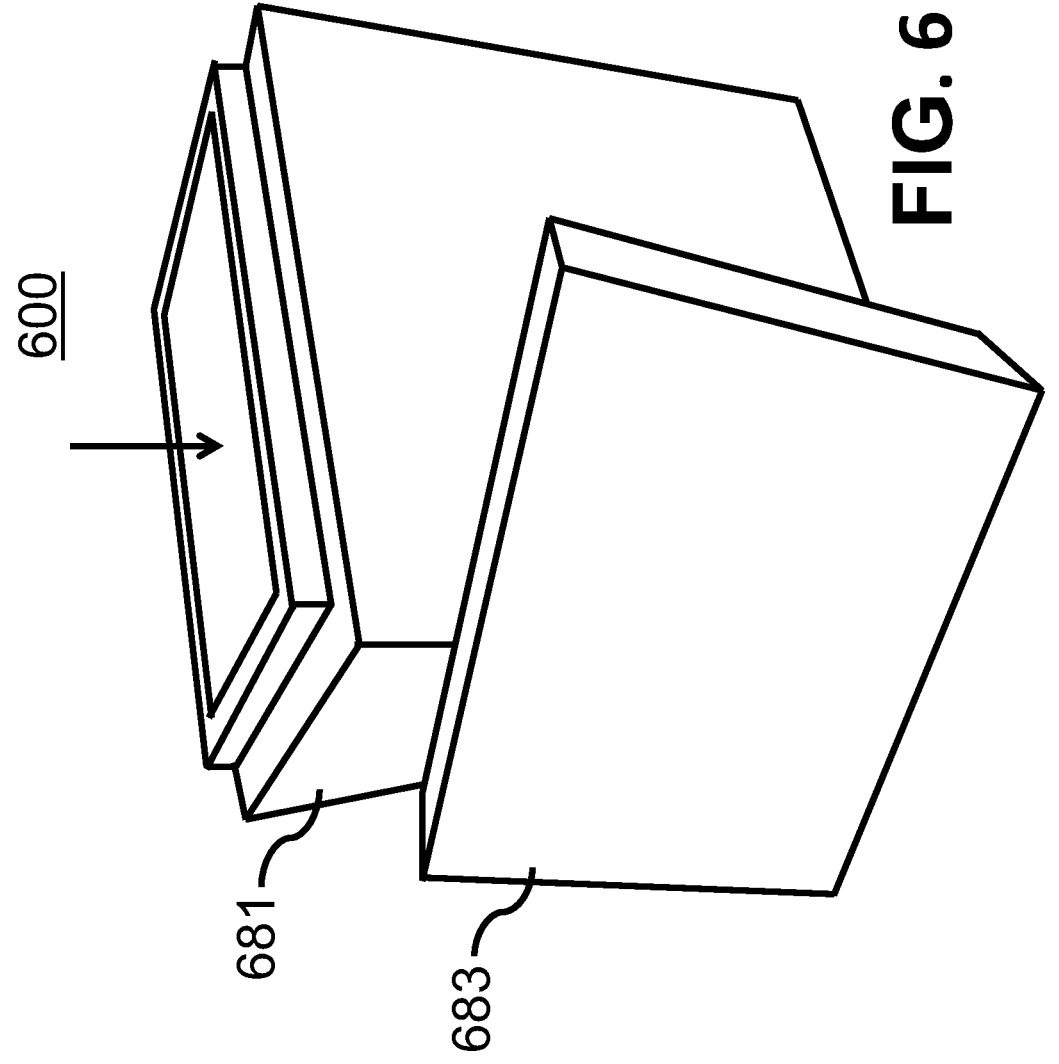
FIG. 6 illustrates a foam packaging system, in accordance with an embodiment of the disclosure.

FIG. 6 illustrates a foam packaging system 600 (including body 681 and lid 683), in accordance with an embodiment of the disclosure. As shown, the porous composite foam (e.g., foam described in any of the aforementioned embodiments) is shaped to have five surfaces enclosing a recess (e.g., in body 681) that is shaped to hold materials (e.g., frozen goods, case of cans, hot goods, etc.). In some embodiments, the five surfaces/sheets of foam may be considered connected at least in part: however, in other embodiments the sheets may be disconnected (e.g., held within in another container to form the recess). Lid 683 may be made of the same foam as body 681. In the depicted embodiment, pores of the porous composite foam are structured so the porous composite foam has an R factor (measurement of how well a material resists the flow of heat through it) of 3-5.5. Thus, the porous composite foam adequately insulates the interior of body 881 when lid 683 is placed on the body. In the depicted embodiment, lid 683 has recesses to align with protrusions around the edge of body 681, to align lid 683 with body 681 and hold lid 683 in place. It is appreciated that the cooler-like foam packaging system 600 may both be used to keep hot-goods hot, and cold-goods cold. Foam packaging system 600 may be formed using any of the methods/techniques discussed above, and other methods, in accordance with the teachings of the present disclosure. Potential applications for this foam with insulating properties are cold chain packaging including fresh food delivery, pharmaceutical, electronics packaging, or the like.

Figure 7:
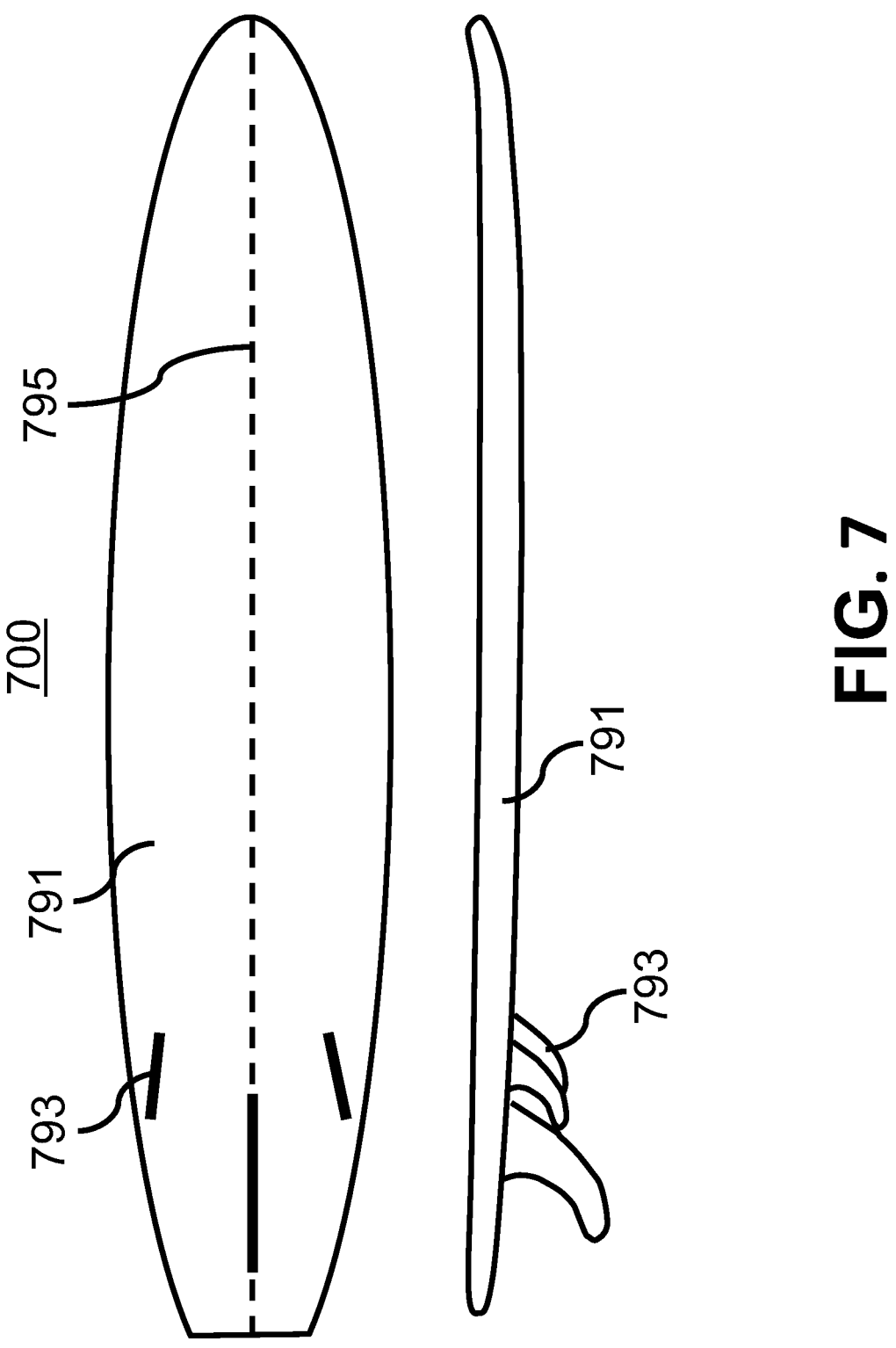
FIG. 7 illustrates a recreational water device, in accordance with an embodiment of the disclosure.

FIG. 7 shows a recreational water device 700, in accordance with an embodiment of the disclosure. The depicted recreational water device 700 is a surfboard or boogie board including body 791, fins 793, and stringer 795. The top figure depicts a bottom-up view of recreational water device 700 showing the location and orientation of the fins 793, and the bottom figure depicts a side view of recreational water device 700. As shown, body 791 has a length that is longer than the width, and also has a back end and a front end where the front end is convex (to cut through the water when ridden by a user). The back end may be flat, convex "v" shaped (e.g., a "fish" board), or the like. Body 791 includes a porous composite foam (e.g., foam described in any of the aforementioned embodiments) having a density of less than 1 $g/cm^3$, and the porous composite foam includes a polymer matrix including monomer units of D-glucosamine and N-acetyl-D-glucosamine (the polymer matrix includes 50% or less N-acetyl-D-glucosamine) and a dispersed phase disposed in the polymer matrix (the dispersed phase and the polymer matrix form the porous composite foam).

In the depicted embodiment, stringer 795 (e.g., a thin long piece of structural wood or other material) extends lengthwise through body 791 with the porous composite foam disposed on either side of stringer 795. A coating (e.g., coating described above in connection with FIG. 3) encases both the porous composite foam and stringer 795. As shown, one or more fins may be disposed proximate to the backend, and positioned to direct the recreational water device through water. In the depicted embodiment there is a central larger fin with two smaller fins offset and angled toward the center of body 791. In other embodiments, there may be more or fewer fins, in accordance with the teachings of the present disclosure. As stated in connection with other embodiments described herein, the dispersed phase includes at least one of chitin, starch (e.g., a polymeric carbohydrate including many glucose units joined by glycosidic bonds), or cellulose, and the polymer matrix may include a nontoxic plasticizer to impart a flexible character, and in some embodiments an elastic character, to the porous composite foam. As shown, the body may be shaped (when viewed from top down or bottom up) to be substantially ellipsoidal, and the front end of the board may taper slightly up (as shown in the side view).

FIG. 8 shows a table 800 of measured biodegradable foam properties, in accordance with an embodiment of the disclosure. The properties are from foam samples produced in accordance with the teachings of the present disclosure. As depicted, in some embodiments, biodegrdable foam produced without plasticizer has a density ranging from 0.15 $g/cm^3$-0.23 $g/cm^3$ and has a compressive strength range (10% deformation) of 0.2 Mpa and 0.48 Mpa, respectively. Additionally, the foam without plasticizer has an elastic modulus ranging from 4.230 Mpa-6.550 Mpa for less dense and more dense foam, respectively. Biodegrdable foam samples produced with plasticizer (e.g., glycerol) may have a 0.25 vol % of glycerol and 1 vol % glycerol, and a density of 0.20 $g/cm^3$ and 0.27 $g/cm^3$, respectively. The compressive strength of these samples may be 0.17 Mpa and 0.106 Mpa, respectively. And the elastic modulous of the two samples are 3.4 Mpa and 2.01 Mpa, respectively. The data in table 800 demonstrates that foams with a wide range of material properties may be produced following the teachings of the present disclosure.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A composite material, comprising:

a polymer matrix including chitosan, wherein the polymer matrix is greater than 50% chitosan;

a dispersed phase disposed in the polymer matrix, wherein the dispersed phase includes starch, wherein the dispersed phase and the polymer matrix form a porous composite foam wherein the porous composite foam has a density of less than 1 $g/cm^3$, wherein an average pore size of pores of the porous composite foam is from 200 μm to 800 μm, wherein the dispersed phase further includes chitin, and wherein the porous composite foam includes, by weight, 0.5-2.5 times the chitin of the dispersed phase to the chitosan of the polymer matrix.

2. The composite material of claim 1, further comprising a coating disposed on an exterior of the porous composite foam, wherein the coating is substantially non-porous and includes chitosan.

3. The composite material of claim 2, wherein the coating encapsulates the porous composite foam to prevent water ingression into the porous composite foam, and wherein the polymer matrix includes 90% or more chitosan.

4. The composite material of claim 1, wherein loads imparted on the porous composite foam are transferred, at least in part, from the polymer matrix to the dispersed phase.

5. The composite material of claim 1, further comprising a plasticizer disposed in the polymer matrix to impart a flexible character to the porous composite foam.

6. The composite material of claim 5, wherein the plasticizer includes a polyol.

7. The composite material of claim 1, wherein the composite foam includes at least one of a sodium or calcium salt.

8. The composite material of claim 1, wherein the dispersed phase further includes at least one of shellfish shells, wood flour, paper pulp, corn starch, coconut husks, hemp, or tapioca powder.

9. The composite material of claim 1, further comprising a dye disposed in the polymer matrix, wherein the dye imparts a color to the porous composite foam.

10. The composite material of claim 1, wherein the porous composite foam is shaped to have five surfaces enclosing a recess that is shaped to hold materials, and wherein the pores of the porous composite foam are structured so the porous composite foam has an R factor of 3-5.5.

11. The composite material of claim 1, wherein the chitosan includes D-glucosamine monomer units and N-acetyl-D-glucosamine monomer units, and wherein the chitosan is composed of 50% or less of the N-acetyl-D-glucosamine monomer units.

12. The composite material of claim 1, wherein the porous composite foam has a uniform cellular structure.

13. The composite material of claim 1, wherein the dispersed phase is not dissolved in the polymer matrix.

14. The composite material of claim 1, wherein the composite material has compressive strength from 0.106 MPa to 0.48 MPa at ten percent deformation.

15. The composite material of claim 1, wherein the composite material has an elastic modulus from 2.01 to 6.55 MPa.

16. The composite material of claim 1, further comprising a nontoxic plasticizer disposed in the polymer matrix to impart a flexible character to the porous composite foam.

17. The composite material of claim 1, wherein the dispersed phase further includes starch, and wherein the porous composite foam includes, by weight 0.1-0.2 times the starch of the dispersed phase to the chitosan of the polymer matrix.

18. The composite material of claim 1, wherein the density is from 0.1-0.8 $g/cm^3$, and wherein the polymer matrix is greater than 90% chitosan.

19. The composite material of claim 1, further comprising a polymer coating disposed on an exterior of the porous composite foam, wherein the polymer coating includes at least one of polylactic acid or polyglycolide.

20. A composite material, comprising:
a polymer matrix including chitosan, wherein the polymer matrix is greater than 50% chitosan; and
a dispersed phase disposed in the polymer matrix, wherein the dispersed phase includes chitin, wherein the dispersed phase and the polymer matrix form a porous composite foam, wherein the porous composite foam includes, by weight, 0.5-2.5 times the chitin of the dispersed phase to the chitosan of the polymer matrix, and wherein the porous composite foam has a density of less than 1 $g/cm^3$.

21. The composite material of claim 20, wherein the polymer matrix is greater than 90% chitosan, and wherein the density is from 0.1-0.8 $g/cm^3$.

\* \* \* \* \*